Oct. 16, 1934.    G. NELSON    1,977,009
DISPLAY DEVICE
Filed Nov. 11, 1933    4 Sheets-Sheet 1

Oct. 16, 1934.            G. NELSON            1,977,009
                         DISPLAY DEVICE
                   Filed Nov. 11, 1933      4 Sheets-Sheet 3

Inventor:
George Nelson.

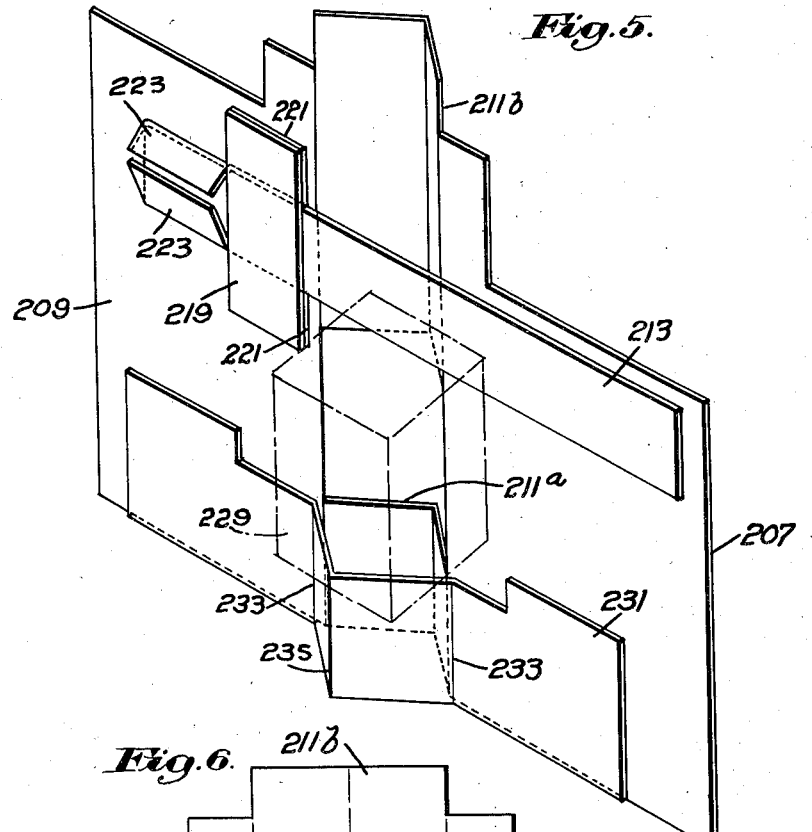
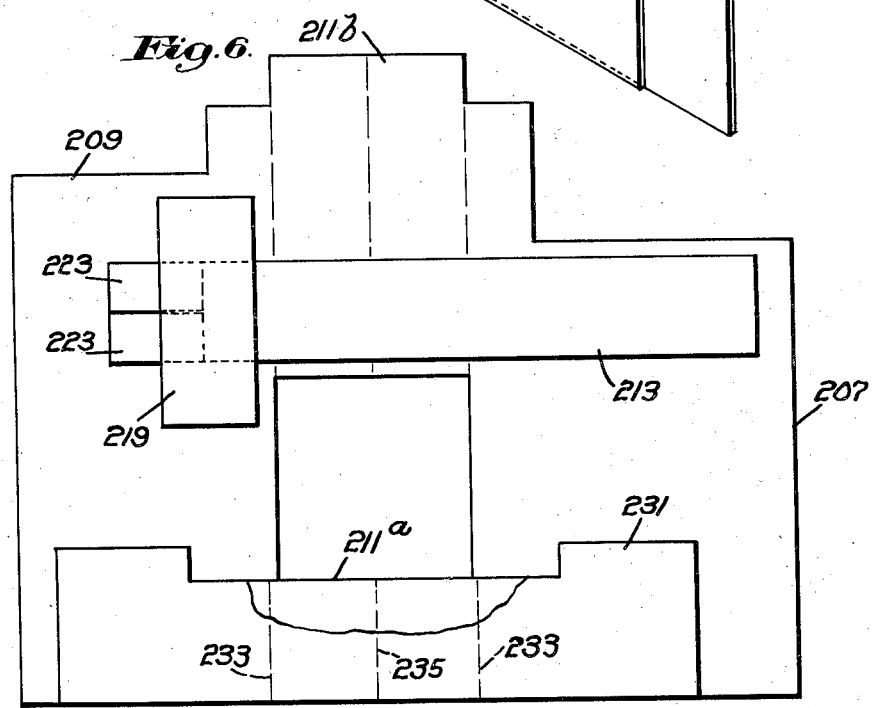

Patented Oct. 16, 1934

1,977,009

UNITED STATES PATENT OFFICE 1,977,009

DISPLAY DEVICE

George Nelson, Revere, Mass., assignor to Forbes Lithograph Manufacturing Company, Chelsea, Mass., a corporation of Massachusetts Application November 11, 1933, Serial No. 697,674

7 Claims. (Cl. 40—126)

This invention relates to display devices such as are commonly used in the windows and on the counters of merchants to advertise merchandise, and the object is to provide an improved construction of a three-dimensional display which may be collapsed flat for shipping or storage and readily set up.

My invention will be well understood by reference to the following description of certain illustrative embodiments thereof shown by way of example in the accompanying drawings, wherein:—

Figs. 5 and 6 are similar views of a still further modification.

Figure 1:
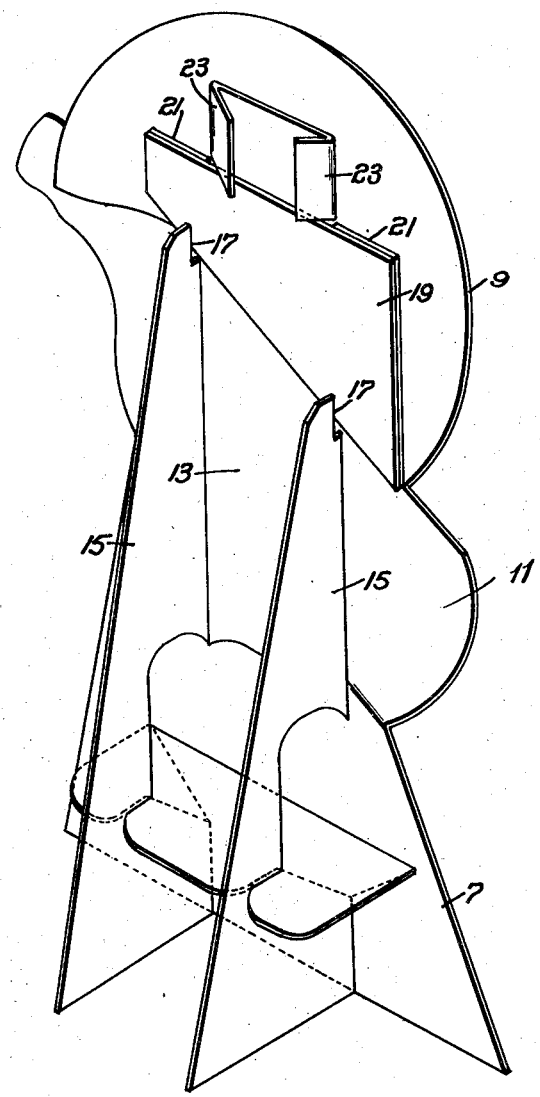
Fig. 1 is a perspective view of the rear of a display device.
Figure 2:
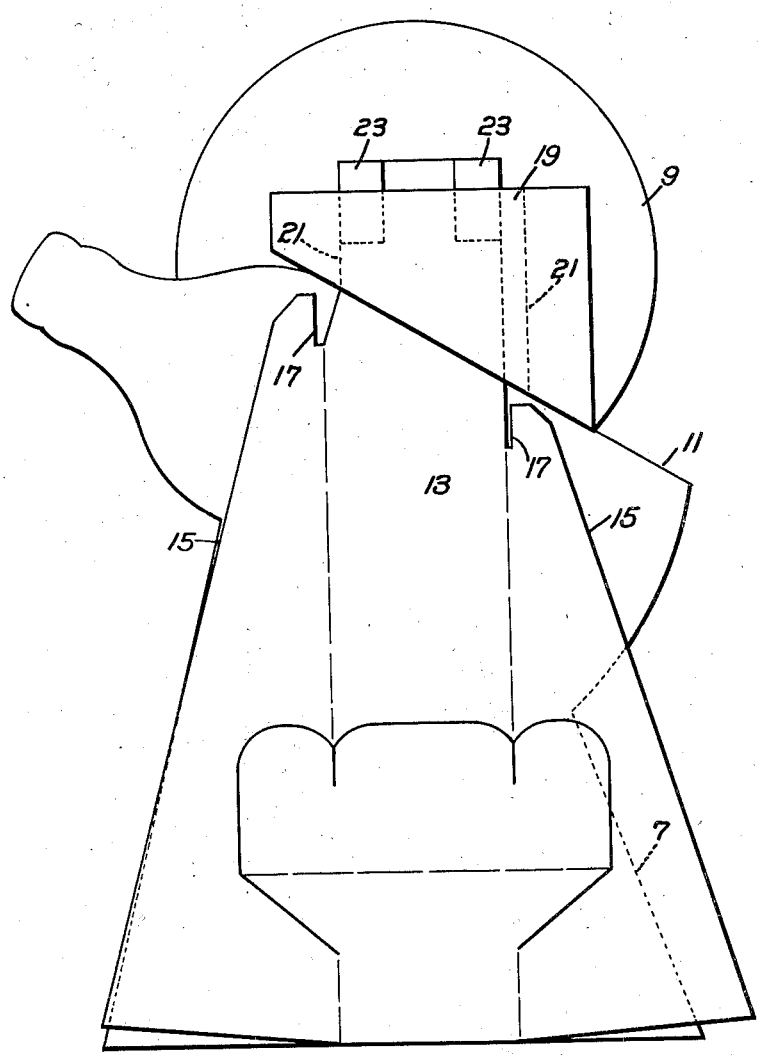
Fig. 2 is a rear plan of the same in collapsed position.

Referring to the form shown in Figs. 1 and 2, the display device shown therein comprises a main or display surface which it will be understood will be suitably imprinted on the side further from the reader viewing Fig. 1 and which may be constructed from a single piece of card embodying the sections 7 and 9 spaced, herein vertically, and receiving between them the intervening section 11 which may be hingedly connected to the opposed edges of the spaced sections 7 and 9 as by means of suitable score lines. The parts may lie flat, as indicated in Fig. 2, with the several sections in a single plane, or the sections 7 and 9 may be drawn toward one another to provide a fullness in the intervening section 11, causing the same to bulge to one side. Herein the section 11 is thus bulged out an approximately semi-cylindrical form and it may be shaped and delineated to represent a bottle, as indicated in the drawings.

To maintain the parts in the expanded or set-up position in which the intermediate section 11 is bent out of the plane of the other sections, suitable means may be provided for holding the end sections in approximated position. Herein such means are organized as a part of a supporting easel which in the form illustrated is of the general type disclosed in the patent to Wilson 773,177 of October 25, 1904, and requires no extensive description. It is sufficient herein to point out that this easel embodies a web 13 and flanges 15 which may either be collapsed into the same plane as the web, as shown in Fig. 2, or folded out at right angles thereto, as shown in Fig. 1. The web of the easel is connected to the lower section 7 providing a stand therefor when erected and extends as a tongue projecting past the intermediate section 11 and overlying the back of the upper section 9. At the junction of the wings 15 with the web at the upper ends of the former there may be provided the slots 17 for a purpose to be described. Secured to the back of the section 9 is a keeper, herein shown as of loop-like form and comprising the strip 19, the central portion of which is spaced away from the back surface of the section 9 by the underlying spacing pieces 21, the end of the web 13 sliding under the strip 19 and between these pieces 21, and means are provided on the distal end of the web or tongue 13 to engage with the further edge of the keeper to maintain the section 9 in the depressed position shown in Fig. 1. Herein the end of the web is provided with laterally projecting flange portions 23 which may be folded over on the face thereof and will in the collapsed position of the parts be received beneath strip 19 but will, when the sections 7 and 9 are drawn together, spring out due to the resiliency of the material to permit them to engage over the further edge of the keeper to maintain the parts in the form shown in Fig. 1. In this position the lower edge of strip 19 may enter the slots 21 referred to, the portions of the rearwardly folded flanges 15 thus overlying rearwardly the keeper and the section 9 to which it is attached and thus aiding in maintaining the former in proper position.

Figure 3:
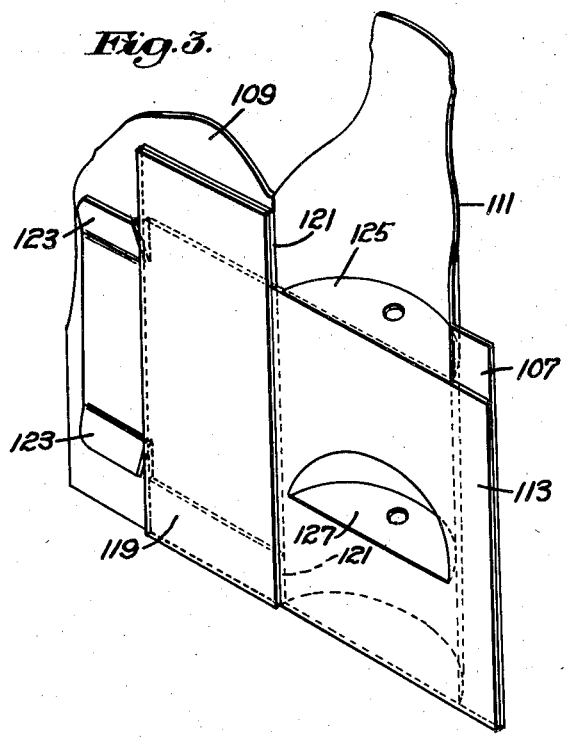
Figs. 3 and 4 are similar views of a modified form.
Figure 4:
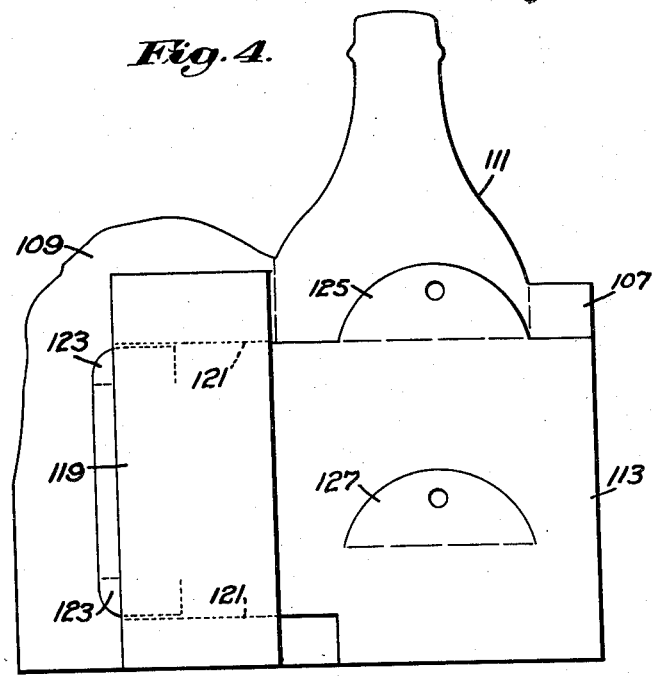

In Figs. 3 and 4, I have shown another modification in which parts corresponding to those illustrated in Figs. 1 and 2 are indicated by the same reference numeral increased by 100. Thus there are provided spaced sections 107 and 109 corresponding to the sections 7 and 9 of the modification of Figs. 1 and 2, to the proximate edges of which is hingedly connected the intermediate section 111. The sections, however, are horizontally spaced rather than vertically, and when the fullness of the intermediate section is drawn out to the bulged form shown in Fig. 3, therein supposed to represent a bottle, an extended base is provided for supporting the display, dispensing with an auxiliary easel. The tongue 113 attached to section 107 passes beneath the keeper 119 on the section 109. In Figs. 3 and 4, however, the lateral flange portions 123 are normally disposed in the same plane as the main body of the tongue 113 and may lie flat beneath the keeper 119 in the collapsed position of the parts, as shown in Fig. 4. When the sections 107 and 109 are drawn together and the inner edges of these flanges 123 pass the further edge of the keeper, they may be bent slightly forward as illustrated in Fig. 3 to engage that edge and maintain the parts in erected position. Substantially semi-circular members 125 and 127 are here shown as provided respectively on the upper edge of the tongue 113 and as cut out from the body thereof, and after the spaced sections have been drawn together to cause the intermediate section 111 to bulge they may be folded at right angles to the tongue in the manner illustrated in Fig. 3 to extend into the hollow of the section 111 to maintain the same in its distended form.

In the modification illustrated in Figs. 5 and 6 the parts corresponding in a general way to those of the previous modifications are designated by the same numbers with the further addition of 100. Thus the sections 207 and 209 are spaced sections corresponding to the parts 7 and 9 of the modification of Figs. 1 and 2 and to the parts 107 and 109 of the modification of Figs. 3 and 4, and their proximate edges have hingedly connected thereto an intermediate section which is herein cut away centrally to provide upper and lower portions 211a and 211b respectively. This intermediate section is herein shown as scored so that when the lateral sections 207 and 209 are drawn together it assumes an angular form rather than a curvilinear form as in the other modifications. The part 211a when bent out of the plane of the sections 207 and 209 in the manner shown in Fig. 2 provides an extended support for holding the display in an upright position and also serves as a stand for supporting an article of merchandise to be displayed, such as the carton 229 illustrated in dotted lines in Fig. 1.

To further contribute to the stability of the structure and to provide additional support for the carton or similar device a member 231 may be secured adjacent the lower edges of the sections 207 and 209, the middle part thereof lying in opposition to the portion 211a, and this middle portion may be hingedly connected to the end portions along the scored lines 233 and may be provided with the central score 235 permitting it to bulge outwardly in the opposite direction from the section 211a. This central portion and the part 211a provide an extended supporting base for the display device and a supporting surface of large area for the carton 229. The tongue 213 is secured to section 207 and it and cooperating parts correspond in structure and function to the tongue formed by the web 13 and the cooperating parts in the modification of Figs. 1 and 2. The tongue is here shown as disposed in opposition to the section 211b so as to be concealed thereby when the display is viewed from the front, that is, from the further side of Fig. 5.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. A device of the class described comprising spaced sections, an intervening section hingedly connected at its edges to the adjacent edges of the spaced sections alternatively to lie in the same plane therewith when they are drawn apart from each other or to provide a fullness projecting from their plane when they are moved toward one another in that plane, and means to hold the spaced sections in the latter position comprising a tongue carried by one section and adapted to extend over the other, a keeper on the second section beneath which the tongue extends and means at the distal end of the tongue to engage the further edge of the keeper.

2. A device of the class described comprising spaced sections, an intervening section hingedly connected at its edges to the adjacent edges of the spaced sections alternatively to lie in the same plane therewith when they are drawn apart from each other or to provide a fullness projecting from their plane when they are moved toward one another in that plane, and means to hold the spaced sections in the latter position comprising a tongue carried by one section and adapted to extend over the other, and a keeper on the second section beneath which the tongue extends, the distal end of the tongue having a lateral foldable flange to be bent from the plane of the tongue to engage the edge of the keeper.

3. A device of the class described comprising spaced sections, an intervening section hingedly connected at its edges to the adjacent edges of the spaced sections alternatively to lie in the same plane therewith when they are drawn apart from each other or to provide a fullness projecting from their plane when they are moved toward one another in that plane, an easel carried by one of the spaced sections comprising a web and a flange slotted at their junction, the second spaced section having a keeper beneath which the web may pass and adapted to enter the slot when the sections are drawn together, the web having means at its distal end to engage the further edge of the keeper to maintain the parts together.

4. A device of the class described comprising a plurality of sections hingedly connected serially to lie extended in a single plane and means for holding them drawn together to lie at least in part out of such plane comprising a tongue carried by one section and adapted to extend past an adjacent section to a non-adjacent section, said tongue having distally thereon a lateral flange folded over the face thereof and a keeper on said lateral section beneath which said tongue and its folded flange is adapted to pass and behind the remote edge of which said flange is adapted to spring.

5. A device of the class described comprising spaced sections, an intervening section hingedly connected at its edges to the adjacent edges of the spaced sections alternatively to lie in the same plane therewith when they are drawn apart from each other or to provide a fullness projecting from their plane when they are moved toward one another in that plane, a tongue carried by one spaced section and adapted to interlock with the other to hold the parts in the latter position and distending means carried by the tongue foldable at an angle thereto to enter the fullness and maintain the same in desired contour.

6. A device of the class described comprising spaced sections, an intervening section hingedly connected at its edges to the adjacent edges of the spaced sections alternatively to lie in the same plane therewith when they are drawn apart from each other or to provide a fullness projecting from their plane when they are moved toward one another in that plane, said intermediate section being cut away to provide a recess to receive an article to be displayed, a tongue carried by one spaced section and adapted to extend behind a portion of the intermediate section to be concealed thereby, a keeper on the second section beneath which the tongue extends and means at the distal end of the tongue to engage the further edge of the keeper.

7. A device of the class described comprising spaced sections, an intervening section hingedly connected at its edges to the adjacent edges of the spaced sections alternatively to lie in the same plane therewith when they are drawn apart from each other or to provide a fullness projecting from their plane when they are moved toward one another in that plane, said intermediate section being cut away to provide a recess to receive an article to be displayed, a member secured to said spaced sections in opposition to a portion of the intermediate section, the middle portion of said member projecting in the opposite direction from said intermediate section when the spaced sections are drawn together, a tongue carried by one spaced section and adapted to extend behind another portion of the intermediate section to be concealed thereby, a keeper on the second section beneath which the tongue extends and means at the distal end of the tongue to engage the further edge of the keeper.

GEORGE NELSON.